Sept. 22, 1959  A. A. OBERMAIER  2,904,995
DEW-POINT DETECTING DEVICE
Filed Dec. 10, 1953
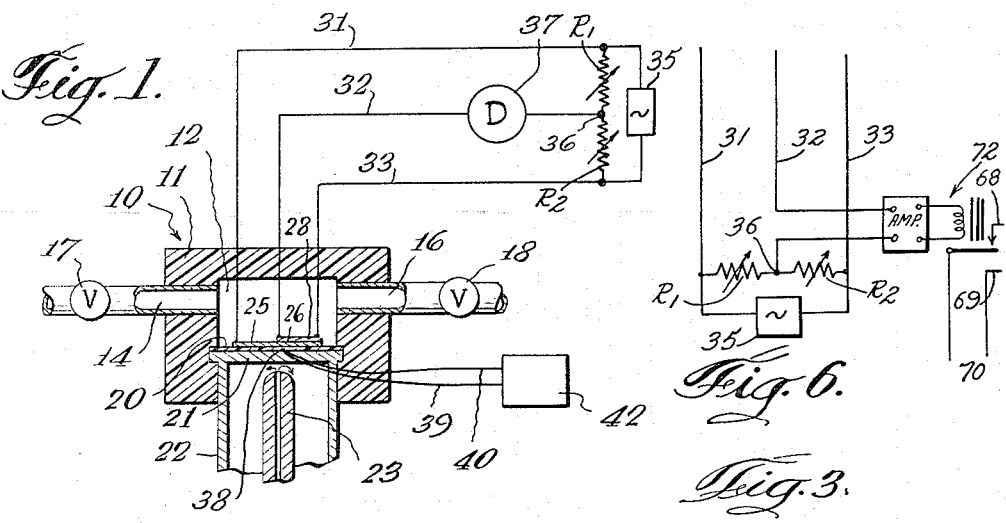
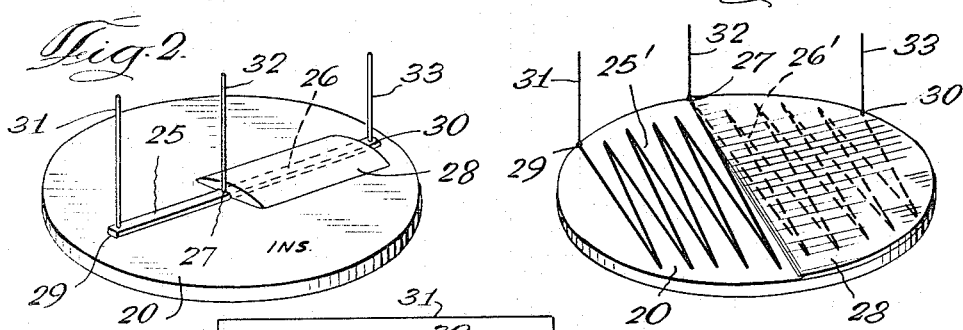
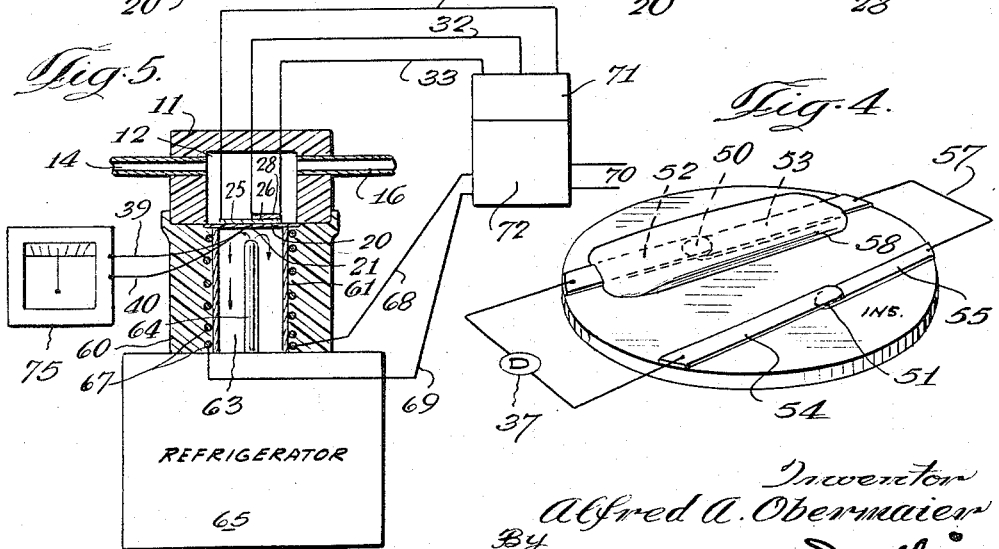
Inventor
Alfred A. Obermaier
By
Silverman & Mullin
Attorneys

United States Patent Office 2,904,995
Patented Sept. 22, 1959

2,904,995
DEW-POINT DETECTING DEVICE

Alfred A. Obermaier, Park Ridge, Ill., assignor to Illinois Testing Laboratories, Inc., Chicago, Ill., a corporation of Illinois Application December 10, 1953, Serial No. 397,343

6 Claims. (Cl. 73—17)

This invention relates generally to dew-point determining apparatus and specifically is concerned with apparatus for precisely determining the dew-point of a gas or vapor without depending upon the visual powers of an observer or the sensitivity of photoelectric cells.

In a co-pending application entitled "Dew-Point Measuring Device," filed July 13, 1951, by Edwin W. Donath, bearing Serial No. 236,559, now Patent No. 2,680,371, and assigned to the same assignee as the instant application, there is described in considerable detail a device for detecting dew-point which depends for its principles of operation upon the latent heat of condensation of the moisture carried by the gas or vapor whose dew-point is being determined. Basically, the invention therein described and claimed utilizes a temperature-sensitive element which has such mass as to be affected by very small changes in temperature. This element is exposed to the gas or vapor and cooled, and as it cools, its temperature drops at a smooth rate. Likewise the gas immediately surrounding the element is cooled. The moment that moisture begins to condense upon the element, liberation of heat of condensation will cause a sudden change in the gradual dropping of the temperature. This is detectable, and when it occurs, the temperature of the sensitive element is very close to being the dew-point.

In referring to dew-point herein, the intention is to infer only the precise and physically defined dew-point. In this connection, it is emphasized that those definitions which have in some instances been related to the objective symptoms of the dew-point having been reached have been inadequate and not uniform. This is principally because they depend upon the ability of some apparatus for detecting the dew-point, and they vary according to the sensitivity of the instrument. It is thus no excuse that our instrumentation has lacked the ability to indicate sufficiently near the true change of state which the dew-point represents to justify that we tie our definitions to the instruments.

The definition of the dew-point is stated in "Theory of Heat" by Thomas Preston (MacMillan 1929, 4th edition) on page 418: "If an atmosphere containing some aqueous vapor be gradually cooled, a temperature will be reached at which the vapour will begin to condense. This temperature is called the dew-point." This is the definition which is intended herein, it being immaterial what the means of detection of the same may be. The change in state as required by the dew-point having been reached is productive of an evolvement of heat, and it is the heat which enables the precise determination of the dew-point to be made, both in the said co-pending application, and as well in the invention described and claimed herein.

Accordingly it is an important object of the invention to provide a dew-point detecting device which depends for its principles of operation upon the liberation of heat of condensation at the dew point.

It is believed that this invention, like that described and claimed in the above referred to co-pending application enables the dew-point to be detected very soon after it has occurred, and in this respect the objects of this invention parallel those of the said co-pending application. These are to provide more accurate determination with simple apparatus, to make it unnecessary that there be an observer who must guess when he first sees a fog forming on a mirror, and to eliminate the need for involved photoelectric apparatus.

Another object of the invention is to provide a novel and improved device for the detection of the dew-point in which there are a pair of identical heat-sensitive elements forming the arms of a bridge which is normally balanced, but whose balance is upset when the dew-point is reached whereby to produce an error signal in the detecting device of the bridge.

Another object of the invention is to provide a device of the character described in which there are identical bridge arms whose mass is small and hence whose heat capacity is comparable to that of the condensate which will deposite thereon when the dew-point is first reached, the said bridge arms being formed of material whose electrical conductivity is sensitive to temperature, one arm being protected from the deposition of moisture, the device including means for gradually lowering the temperature of both arms while subjecting the unprotected one to a vapor or gas having moisture therein, whereby the bridge will become unbalanced and give an indication on a detecting device when the dew-point is reached.

A primary object of the invention is to provide a dew-point detecting device in which two thermally sensitive elements are subjected to low temperature with a connection existing therebetween having a detector therein, the detector normally providing no signal, but one of the elements being protected from moisture whereby when the dew-point deposits moisture on the other element and raises the temperature thereof, a signal will be produced whereby to indicate the precise instant that it occurs.

Another object of the invention is to provide a highly sensitive dew-point detecting device utilizing the principles described herein, but which will enable the error signal to be of a higher order than heretofor available.

Another object of the invention is to provide a dew-point detecting system with a continually recording device operated thereby.

Many objects, of course, will occur to those skilled in this art and which have not herein been enumerated. The apparatus is also capable of being utilized in many different forms and variations, without in any way departing from that which is the invention. Systems other than those illustrated are easily devised using the principals enunciated herein and the structure described hereinafter. The advantages and benefits are common to all and stem from the novelty herein.

As required by the patent laws, preferred embodiments have been described in considerable detail and illustrated. It is desired to point out that for the most part the illustrations are diagrammatic since the structures symbolized are well-known to the artisans skilled in this art, and as for those parts of the apparatus which may not be totally familiar, the illustrations carefully depict the same and the text describe the same. Where practical, the same characters of reference are used to designate the same or similar parts throughout the several figures of the drawings.

In the drawings:

Fig. 1 is a schematic or diagrammatic sectional view through a dew-point detecting device which is constructed in accordance with the teachings of the invention and which operates on the principle of production of heat of condensation of a vapor to vary the electrical effects of an otherwise balanced bridge.

Fig. 2 is a perspective view, albeit still somewhat diagrammatic, showing the collector and the temperature-sensitive elements of the device illustrated in Fig. 1.

Fig. 3 is a view in perspective of a collector for use with a dew-point detecting device or system in which the thermally sensitive elements are formed of a plurality of parts arranged to give long tortuous electrical paths to the said elements.

Fig. 4 is a view in perspective of still another collector, the same being also somewhat diagrammatic, and illustrating a modified form of collector for use with a dew-point detecting device. This form is characterized by the fact that the thermally sensitive elements are both thermocouples of identical construction.

Fig. 5 is a semi-diagrammatic sectional view showing a continually recording system for determining dew-point utilizing the principles of the invention.

Fig. 6 is a diagrammatic view illustrating portions of the system of Fig. 5 which are shown in block diagram.

Prior to entering upon the detailed discussion of the invention it is desired to point out certain differences between the instant invention and structures which have heretofore been known. It is known, for example to utilize an electrically conductive member or several such members subjected to the deposit of moisture from condensation, where the total conductivity is changed through electrical leakage in the moisture across the surfaces supporting these conductive members. Such apparatus is crude, to say the least, because the amount of moisture which must be deposited in order to provide leakage paths is so great as to occur long after the dew-point has been reached.

In such cases, where the conductor which is exposed to the moisture is a part of a bridge, there has never been any necessity for the balance arm of the conductor also to be subject to cooling and hence it has been exterior of the chamber where the cooling takes place.

In this invention, the conductivity of the element which is being cooled is in no wise affected by the presence or absence of condensate per se. The conductivity is affected by the addition of the heat of condensation when the dew-point has precisely been reached. Also, in order to maintain a high degree of accuracy, the balance arm or the companion element is simultaneously being subjected to the identical lowering of temperature, so that the conductivity difference which occurs at the dew point is wholly attributable to the heat of condensation of the vapor and cannot be due to electrical leakage or intentional losses.

The invention depends upon a comparing structure—that is, a structure where the heat of condensation is prevented from affecting one element of a pair of thermally sensitive elements whose temperatures are being simultaneously lowered by subjecting both of them to a common cooling process. In one form, the invention is characterized by the provision of a bridge, there being a pair of balanced arms both of which are mounted upon a moisture collector and both of which are subjected to the same refrigeration. The mass of the respective elements is identical and is very low so that the heat capacity of the elements is of the same order as the moisture which will condense thereon during the process of determining the dew point. Obviously the less the mass the sooner will the dew-point be determined after it occurs. One element is freely exposed to the atmosphere in the chamber of the apparatus while the other is thermally protected from that atmosphere so that it is practically impossible for the second element to be affected by the production of heat of condensation in the manner that the first element is affected. The liberation of heat will upset the bridge balance and result in a signal in the detector. This signal, in the most basic form of apparatus is an indication of when to read the temperature detecting device. This latter may consist of a thermocouple and a potentiometer driven thereby.

In another form, the signal from the detector of the bridge is used to drive a servo-system to actuate some recording or tabulating device operating in conjunction with the temperature detecting device. The servo-system is well-known, and its capabilities and flexibility are utilized by engineers for many purposes and in many apparatuses. It is felt that with the production of a signal at a precise time, the mere pointing out that same may be fed into a servo-system is sufficient without the necessity of illustrating such a system.

The above forms are basically the same, since they utilize a balanced bridge to obtain a signal when the dew-point is reached, these bridges requiring an external power source to produce the signal. In the first case, the signal merely indicates when the temperature is reached, and in the second case a signal is applied to some recording or taubulating device. It should be appreciated that the thermocouple itself may also give the indication in the event it is constructed as described in the said co-pending application and is exposed to the condensate produced. However, it is more convenient to use a more rugged thermocouple of larger size than would be possible if it were desired to detect the slight rise produced at the dew-point and to place it at a position where it gives an accurate indication. This might be at or below the surface of the collector or in other positions. Furthermore, with a signal occurring only at the dew-point there is no need to watch the descending temperature indication for a discontinuation in the smooth curvature. This is the crux of the instant invention.

A modification of the recording form above referred to utilizes a heater to drive the moisture off the collector once the dew-point has been reached. The error signal produced operates a relay system which in turn energizes or de-energizes a heater adjacent the chamber of the apparatus. The continuous recording instrument thus shows the dew point continually.

The second form of the invention utilizes a pair of thermocouples instead of bridge arms thereby eliminating the necessity for an external source of power. In all other respects it is the same as the structures described and is capable of being used for the same purposes.

Referring now to Fig. 1, there is illustrated a dew-point detecting apparatus designated generally 10 and including a housing 11 having a gas chamber 12 therein into which the sample is led by way of the conduit 14. An outlet 16 is also provided opening to the chamber. Both conduits have valves 17 and 18 respectively so that the sample introduced may be rendered quiescent if desired. At the bottom of the chamber 12 there is provided a collector 20 which is cooled from below by any suitable refrigerating means. For example, the collector 20 is shown in intimate contact with a metal cap 21 secured on a cylinder 22 forming a cooling source with the jet or expansion valve 23. A source of refrigerant (not shown) forces such refrigerant through the tube of the jet 23 to impinge against the underside of the cap 21 which in turn cools the collector 20. The cap 21 may be eliminated if desired.

The collector has a pair of identical thermally sensitive members mounted thereon as shown at 25 and 26. These are joined at a common end at juncture 27 and the element 26 is covered with a thermally insulative member 28. Opposite ends of the members are indicated at 29 and 30. From such ends and from the juncture 27 there extend electrical leads 31, 32 and 33 through the wall of the housing 11. The leads 31 and 33 are connected across the two resistors $R_1$ and $R_2$ across which is also connected a source of power 35. The center point 36 between resistors $R_1$ and $R_2$ is connected to one side of a detector 37 the other side of which is connected to the lead 32.

A thermocouple 38 is disposed in the collector 20 immediately at or below the surface to give an accurate determination of the temperature of the elements 25 and 26. Its connectors 39 and 40 extend through the housing wall to a temperature indicating device 42 of conventional construction driven thereby.

The gas chamber 11 is preferably made of an insulating material so that the electrical leads and thermocouple leads are easily passed through the walls. Likewise, it is desirable that there be a minimum of heat loss and a minimum of electrical leakage. Although the inlet and outlet conduits 14 and 16 are shown as each having a valve therein, obviously an arrangement such as that shown and described in the co-pending application may be used to lock a sample into the chamber 12. Such insulating material may be glass, plastic resins, phenol condensate resins, etc.

The illustration of Fig. 1 is diagrammatic, as has been stated, and the dimensions are exaggerated greatly, to show the structure thereof. For example, in the actual device, the collector may be a disc of some plastic or glass about 5/16 inch in diameter and about twenty thousandths of an inch in thickness. The elements 25 and 26 are extremely thin deposits upon the surface of the collector 20. They may be of any suitable metal such as pure titanium, various alloys of chromium, nickel and the like, and can be applied either by vacuum evaporation, by printing through the use of photo-etching, and even by pressure as in the case of metals like titanium which have the quality of being able to wet glass. Success has been achieved through the use of very thin metal foils, as well. Care must be taken to assure that the elements are identical in every respect, as to those portions included in the circuit although slight variations may be balanced through adjustment of the constants of the bridge formed by the structure. For example, one or the other of the arms $R_1$ and $R_2$ may be variable or there may be variable resistors in series with elements 25 and 26.

After the elements are applied to the collector member 20, one of them, 26, is covered as shown at 28 by a thermally insulating member. The covering may be a glass slip, a member of plastic or resin, or even a layer of paint, varnish or lacquer.

The detector 37 is arranged across the center points of the two balanced arms of the bridge, i.e., it extends from the point 27 to the central juncture point 36. When the halves of the arms are of equal impedance, or in balanced bridge relationship, then there can be no current flowing through the electrical lead 32, and no signal will be detected. Obviously there is no potential difference between points 27 and 36. This is the normal condition of the bridge. The detector 37 can be a galvanometer or a visual or aural indicator. It can be a sensitive relay system or a simple relay controlling other circuits. It can be a servo-system for actuating switches or relays—and as such the error voltage produced during conditions of unbalance will be the input to the servo-system. It is pointed out that this arrangement can be constructed to produce a relatively large error voltage, one which is larger than the change in the voltage produced in an element due to the physical effect of liberation of heat of condensation.

The source of power 35 for the bridge can be either D.C. or A.C.

In operation, when the dew-point is reached, the heat of condensation will only affect the uncovered element 25 and its conductivity will change thereby unbalancing the bridge and producing a signal to actuate the detector 37. The temperature as read on the temperature indicating device at this instant is an accurate determination of the true dew-point. Incidentally, the temperature indicating device may be a simple potentiometer of high sensitivity, calibrated to read degrees centigrade or Fahrenheit when used with the thermocouple 21. As shown in Fig. 5, a recording type of millivoltmeter may be used. In such case the detecting device 37 may comprise a system which will produce a mark or indication of the position of the galvanometer corresponding to the dew-point. Re-cycling may be accomplished either manually, or through the means of a structure as shown and described in connection with Fig. 5.

In Fig. 3 there is illustrated a practical embodiment of the collector of the invention. Here the collector member 20 has long but tortuously arranged thermally sensitive elements 25' and 26' disposed thereon. The particularly structure shown has the elements in zig-zag form, but this is merely a matter of choice, since the elements may be arranged in loops, rectangles, grids, etc. This structure is probably best applied by the modern techniques used to print circuits involving electro-deposition, photographic fixing, etching, etc. The deposits of metal which are finally placed on the collector obviously should be very thin so that the mass of the elements 25' and 26' will be very low. Thus, the heat capacity will be comparable with the heat of condensation which will affect the element 25' at the dew-point. The same connections and leads are shown. Aluminum and copper are easily deposited by photo-engraving methods, but require substantial lengths to give sufficient resistance for use in a bridge circuit as described.

In Fig. 4 there is illustrated an interesting and convenient form of the invention in which instead of the thermally sensitive elements being merely conductors whose conductivity is affected by heat, they are actual thermocouples which produce voltages themselves. Here there are shown two thermocouples 50 and 51 which are formed by the overlapped junctures of the members 52—53 and 54—55 respectively. The members 52 and 54 are of one metal of the type comprising half of a couple, such as for example, tin, and the members 53 and 55 are of a second metal of the type comprising the second half of a couple such as for example bismuth. The respective layers of the metal are very thin—preferably deposited by vacuum evaporation, so that the resulting thermocouples have very low mass. The members 53 and 55 are connected electrically through the lead 57 and the members 52 and 54 are connected through a detector device 37, by suitable electrical leads. The thermocouple 50 is covered by a thermally insulative member 58.

Obviously the signals produced by the respective thermocouples are in opposition in the circuit illustrated. When both thermocouples are subjected to the identical temperature the signal across the members 52 and 54 will be zero. Thus as the temperature of the entrapped gas is lowered there will be no detectable signal. When, however, the dew point is reached, the juncture 51 will obtain the benefit of the heat of condensation liberated, while the juncture 50 will not, and hence there will be a detectable signal.

Referring now to Fig. 5, there is illustrated therein a continual recording system. Here there is shown a housing 11 having a chamber 12 provided with inlet and outlet conduits 14 and 16. Continuous readings are to be taken and hence no valves are illustrated. Any suitable arrangement for obtaining the necessary error signal may be used. For simplicity there are illustrated the collector 20, elements 25 and 26, cover member 28, leads 31, 32 and 33, thermocouple 21, thermocouple leads 39 and 40, arranged as shown in Fig. 1. The housing 11 is supported upon a column 60 of a highly insulative material such as one of the plastic resins now commercially available, and within the column is provided a cylindrical metal barrel 61 defining a cooling chamber and return path 63. The column is secured to a refrigeration unit 65 of highly compact structure, and the refrigerant is forced through the vertical tube 64 from the top of which it expands into the chamber 63. This cools the collector 20 and lowers the temperature of the gas in the chamber 11.

Wrapped about the cylindrical barrel 61 is a heating unit 67 which is adapted to be energized from a suitable source of power through leads 68 and 69 connecting with a power line 70. The connection between the line and the heating unit is controlled by a relay which is actuated by the detecting means of the device. Since any manner of detecting means may be used, including electronic or other amplifiers and the like, and since the relay arrangements are well within the skill of those versed in this art, the details need not be illustrated. Thus, the leads 31, 32 and 33 connect with a structure 71 which may include a galvanometer, a pair of balance arms for a bridge arranged as in Fig. 1, a source of power for the bridge and the like. For example, the error voltage may be fed, either directly or amplified, to the solenoid of a sensitive relay, the contacts of which close the circuit from the leads 68 and 69 to the line 70. The relay itself is designated by the block 72. The solenoid, relay, amplifier if any, and the heating unit 67 may all collectively be considered the detection means since the heater will be energized only when the dew-point is reached.

A structure such as described above is illustrated in Fig. 6 which shows a pair of balance arms $R_1$ and $R_2$ in the bridge leads 31, 32 and 33, a source of power for the bridge at 35, and an amplifier connected between the lead 32 and the junction 36 and feeding into the coil of the sensitive relay 72 which operates a switch connecting the leads 68 and 69 to the line 70 when a condition of unbalance exists.

It will be seen also that the leads 39 and 40 are connected to a recording millivoltmeter 75 or other sensitive recording instrument preferably calibrated in terms of temperature. Obviously there will be produced a graphical record of the temperature of the thermocouple 21. When moisture is first deposited on the element 25 of Fig. 5, the heater will be energized. The heating of the chamber 63 will drive the moisture off the element 25 (there is such a small amount that this requires very little energy) and the temperature of the gas in the chamber will rise above the dew-point. There will thus be a balanced condition in the output of the elements 25 and 26 and the heater 67 will be de-energized. This cycle repeats giving a record of temperature cycles on the recording device 75. The geometric calibration with reference to the form of the resulting wave is a simple matter so that a continuous determination of dew-point is practical. It is not outside of the scope of the invention also to provide a computing device which will average the resulting temperature cycles in a manner to indicate continuous dew-point directly upon the graph.

In considering the invention as set forth above, it is apparent that two general structures are described. The first of these can be considered the resistance bridge form and the second can be termed the differential thermocouple form. The principles of operation of both are however the same, in that there is what may be termed a bilateral circuit having a balanced condition which is upset when the dew-point is reached and the heat of condensation is liberated raising the temperature of one of an identical pair of thermo-sensitive elements. In both cases the thermo-sensitive elements of the balanced pair are identical in all respects except that one is insulated from the gas or vapor of the chamber. Both are required to be of low mass such that the addition of a small increment of heat of the order of that liberated by condensation will detectably affect the total physical properties of one element.

It is again pointed out that the invention in its basic and simplest forms is capable of practical application in a myriad of variations, none of which depart from the spirit or scope of the invention in any important manner. The range of equivalents should therefore be considered broad, in view of the state of the art as it now exists, as defined in the appended claims.

What it is desired to claim by Letters Patent of the United States is:

1. A dew-point detecting device including a gas chamber, a collector in the chamber, means responsive to changes of gas temperature including a thermocouple mounted on the collector and electrical conductors extending from the thermocouple outside of the chamber capable of providing an electrical output from the thermocouple, a bilateral circuit including a detector across branches of said circuit and having a pair of thermally-sensitive balance arms of extremely low mass mounted on the collector with one of the elements exposed to and other thermally insulated from the gas, said circuit being balanced at temperatures above the dew-point, and means for lowering the temperature of the gas to the dew-point to subject the exposed arm to heat of condensation liberated independent of the insulated arm whereby to unbalance said circuit and operate the detector, said detector including re-cycling means operative to raise the temperature of the collector when the dew-point has been reached, said re-cycling means including an electric power source, a relay the solenoid of which is connected to said bilateral circuit and energized during conditions of unbalance, a heater connected to the source and arranged in the vicinity of the said collector to warm the same, and the relay contacts being arranged to make and break said connections, the relay solenoid being deenergized at conditions of balance.

2. A dew-point detecting device including a gas chamber, a collector in the chamber, means responsive to changes of gas temperature including a thermocouple mounted on the collector and electrical conductors extending from the thermocouple outside of the chamber capable of providing an electrical output from the thermocouple, a bilateral circuit including a detector across branches of said circuit and having a pair of thermally-sensitive balance arms of extremely low mass mounted on the collector with one of the arms exposed to and other thermally insulated from the gas, said circuit being balanced at temperature above the dew-point, and means for lowering the temperature of the gas to the dew-point to subject the exposed arm to heat of condensation liberated independent of the insulated arm whereby to unbalance said circuit and operate the detector, said detector including power amplifying means, the unbalance of the bilateral circuit producing an initiating signal for said power amplifying means, and heating means adjacent said collector driven by said power amplifying means to raise the temperature of the collector when the dew point has been reached whereby to decrease said initiating signal by balancing the bilateral circuit.

3. A dew-point detecting device including a gas chamber, a collector in the chamber, means responsive to changes of gas temperature including a thermocouple mounted on the collector and electrical conductors extending from the thermocouple outside of the chamber capable of providing an electrical output from the thermocouple, a bilateral circuit including a detector across branches of said circuit and having a pair of thermally-sensitive balance arms of extremely low mass mounted on the collector with one of the arms exposed to and other thermally insulated from the gas, said circuit being balanced at temperatures above the dew-point, and means for lowering the temperature of the gas to the dew-point to subject the exposed arm to heat of condensation liberated independent of the insulated arm whereby to unbalance said circuit and operate the detector, a heater mounted in heat exchange relation to the collector and adapted to recycle the device by raising the temperature of the collector above the dew-point and thereby driving moisture off the exposed element, a source of energy for said heater connected with the output of the bilateral circuit and means responsive to the unbalance signal therefrom permitting the transmission of energy to said heater, said responsive means preventing transmission of energy during conditions of balance of said bilateral circuit.

4. A dew-point detecting device including a gas chamber, a collector in the chamber, means responsive to changes of gas temperature including a thermocouple mounted on the collector and electrical conductors extending from the thermocouple outside of the chamber capable of providing an electrical output from the thermocouple, a bilateral circuit including a detector across branches of said circuit and having a pair of thermally-sensitive balance arms of extremely low mass mounted on the collector with one of the arms exposed to and other thermally insulated from the gas, said circuit being balanced at temperatures above the dew-point, and means for lowering the temperature of the gas to the dew-point to subject the exposed arm to heat of condensation liberated independent of the insulated arm whereby to unbalance said circuit and operate the detector, said detector including power amplifying means, the unbalance of the bilateral circuit producing an initiating signal for said power amplifying means, and heating means adjacent said collector driven by said power amplifying means to raise the temperature of the collector when the dew point has been reached whereby to decrease said initiating signal by balancing the bilateral circuit and a recording galvanometer connected in circuit relation with said thermocouple through said electrical conductors.

5. A dew-point detecting device including a gas chamber having means for leading a gas thereinto, a collector in the chamber, a bilateral circuit including a detector across branches of said circuit and having a pair of thermally sensitive, balanced arms of extremely low mass mounted on the collector with one of the arms exposed to and the other insulated from the gas, such circuit being balanced at temperatures above the dew-point, means for lowering the temperature of the gas to the dew-point to subject the exposed arm to heat of condensation liberated independently of the insulated arm whereby to unbalance the circuit and energize said detector, and said detector including signal producing means to provide a signal only upon a condition of unbalance, and hence, only when the dew-point within the chamber is reached.

6. In a device for detecting the dew-point of a gas which comprises a chamber having means for leading the gas thereinto, a collector for the gas condensate in said chamber and means for slowly cooling the collector to lower the temperature of the gas thereat; the improvement which comprises, a bilateral electrical detecting circuit having a bridge part and including as branches a pair of substantially identical thermally sensitive, metallic elements of extremely small mass in intimate physical contact with the collector and subjected identically to such cooling, one element being exposed to the gas and the other being thermally insulated from the gas, the mass of each element being comparable to that of the initial condensate deposited upon said exposed element immediately after the dew-point of the gas is reached, said circuit being normally balanced and said bridge part having a zero potential across the same at temperatures above the dew-point, the circuit being unbalanced upon thermal activation of the exposed elements from heat of condensation of the gas liberated at the dew-point when condensate is deposited thereon, thereby producing the potential across said bridge part, and a detector connected to the bridge part and having a signal output means operable to produce a signal only when unbalance occurs in the dew-point.

References Cited in the file of this patent

UNITED STATES PATENTS

| 880,272 | Bristol | Feb. 25, 1908 |
| 1,994,757 | De Florez et al. | Mar. 19, 1935 |
| 2,632,885 | Barclay | Mar. 24, 1953 |
| 2,649,707 | Donath | Aug. 25, 1953 |
| 2,671,334 | Gunn | Mar. 9, 1954 |
| 2,680,371 | Donath | June 8, 1954 |

FOREIGN PATENTS

| 250,589 | Great Britain | Apr. 7, 1926 |
| 632,680 | Germany | July 11, 1936 |